Patented Apr. 24, 1951

2,550,260

UNITED STATES PATENT OFFICE 2,550,260

PRESERVATION OF FOOD PRODUCTS

Lloyd B. Jensen, Chicago, and William A. Miller, Evergreen Park, Ill., assignors to Swift & Company, Chicago, Ill., a corporation of Illinois No Drawing. Application November 7, 1946, Serial No. 708,450

5 Claims. (Cl. 99—150)

This invention relates to the preparation of an antibiotic substance, and it has to do more particularly with the concentration of an antimicrobial substance of plant origin.

An object of the invention is to provide a potent antibiotic substance of plant origin.

A further object of the invention is to provide an antibiotic substance which is non-toxic to humans.

A still further object of the invention is to provide an antibiotic substance which is heat stable.

An additional object of the invention is to provide an antibiotic material which is capable of inhibiting mold growth.

Yet another object of the invention is to employ an antibiotic substance of the root of the bittersweet vine as an effective preservative for food products.

Other objects and advantages of the invention will be apparent from a description of the invention given below.

The present invention contemplates the preparation of an antibiotic substance naturally associated with the root of the vine *Celastrus scandens* commonly called "bittersweet," belonging to the staff-tree family (Celastruceae). We have found that especially the root of the bittersweet vine yields an antibiotic substance of great potency, as hereinafter more fully described. We have also found that the antibiotic substance produced from the root of the bittersweet vine is lethal to those microorganisms largely responsible for clostridial and bacillary food spoilage and staphylococcus food poisoning. The antibiotic material prepared from the bittersweet vine may, therefore, be advantageously used to preserve food products.

The antibiotic substance of the present invention has been found to destroy gas-forming bacilli of the genus Bacillus such as *Bacillus subtilis* (var. *niger*); the bacilli of the genus Clostridium, such as *Clostridium sporogenes*; the staphylococci, such as *Staphylococcus aureus*, and molds, such as *Penicillium notatum*. It would be an extremely arduous, if not impossible, task to ascertain the response of all of the existing species and varieties of microorganisms to the herein described antibiotic material, but the effects of this material against the microorganisms hereinabove mentioned illustrate the commercial and medical values thereof.

In carrying out the invention, finely cut or ground root material of the bittersweet vine is treated with a suitable organic solvent, such as acetone. The acetone layer containing the constituents of the plant root soluble therein is separated from the acetone insoluble fibrous mass, the acetone removed therefrom and the extract taken up in a carrier solvent, such as ethanol. The following example illustrates an embodiment of the invention and the tests falling thereunder illustrate the potency of the material obtained in accordance with the processes described in the example.

150 grams of bittersweet root were finely minced and the ground wood thereafter placed in a flask and covered with acetone. The flask was held at room temperatures for 70 hours and shaken at intervals. The acetone layer containing the acetone soluble constituents of the bittersweet root was separated from the insoluble material by filtration, and the acetone removed from the extract by distillation under reduced pressure at 42° C. The acetone free extract was taken up in 30 ml. of ethyl alcohol so that 1 ml. of the alcoholic extract contained the acetone soluble material in 5 g. of root (1 ml.=5 g. of root).

In order to evaluate the effectiveness of the antibiotic material in the alcohol solution obtained in accordance with the process described above, the following tests were performed.

Serial dilutions of the extract (1 ml.=5 g. of wood) were made in 10 cc. broth tubes and the tubes inoculated with bacteria. Dilutions of the extract were made in the broth tubes from 1 to 10 to 1 to 80,000, and inoculated with large loops of 24-hour broth cultures of a food poisoning strain of *Staphylococcus aureus* (50,000 cells), *Bacillus niger, Achromobacter perolens, Penicillium notatum, Aspergillus glaucus* and *Clostridium sporogenes*. The tubes were then allowed to incubate at a temperature of 37° C., after which they were inspected for bacterial growth at the end of 1, 2, 5 and 7 days. In the following table are tabulated the results obtained with the aforesaid bacteria, the minus sign (−) indicating no bacterial growth, the positive sign (+) the presence of viable bacteria at incubation periods of 1, 5 and 7 days.

TABLE I

*Bittersweet root extract (1 ml.=5 g. of root) dilutions in broth*

| Organism | Days | 100 | 500 | 1,000 | 2,000 | 5,000 | 10,000 | 20,000 | 40,000 | 80,000 |
|---|---|---|---|---|---|---|---|---|---|---|
| Staphylococcus aureus | 1 | − | − | − | − | − | − | − | + | + |
|  | 2 | − | − | − | − | − | − | + |  |  |
|  | 5 | − | − | − | − | − | − | + |  |  |
|  | 7 | − | − | − | − | − | − | + |  |  |
| Bacillus niger | 1 | − | − | − | − | − | − | − | + | + |
|  | 2 | − | − | − | − | − | − | + |  |  |
|  | 5 | − | − | − | + | + | + | + |  |  |
|  | 7 | − | − | − | + | + | + | + |  |  |
| Achromobacter perolens | 1 | − | − | + | + | − | − | − | + | + |
|  | 2 | + | + | + | + | + | + | + | + | + |
|  | 5 | + | + | + | + | + | + | + | + | + |
|  | 7 | + | + | + | + | + | + | + | + | + |
| Penicillium notatum | 1 | − | + |  |  |  |  |  |  |  |
|  | 2 | − | + |  |  |  |  |  |  |  |
|  | 5 | − | + |  |  |  |  |  |  |  |
|  | 7 | − | + |  |  |  |  |  |  |  |
| Aspergillus glaucus | 1 | − | + | + | + | + | + |  |  |  |
|  | 2 | − | + |  |  |  |  |  |  |  |
|  | 5 | − | + |  |  |  |  |  |  |  |
|  | 7 | + | + |  |  |  |  |  |  |  |
| Clostridium sporogenes | 1 | − | − | − | − | − | − | − | − | − |
|  | 2 | − | − | − | − | − | + | + | + | + |
|  | 5 | − | − | − | − | − | + | + | + | + |
|  | 7 | − | − | − | − | − | + | + | + | + |

The data given in the above table indicate that the antibiotic effects of the bittersweet root extract vary in potency when tested against different organisms. Thus, the extract kills Staphylococcus in dilutions of 1 to 10,000, *Bacillus niger* in dilutions of 1 to 1,000, and 1 to 100 for *Penicillium notatum*, and 1 to 5,000 for *Clostridium sporogenes*. The bactericidal properties of the extracts were determined by inoculating nutrient agar plates with 0.1 cc. of the dilutions which had been allowed to incubate for 7 days. After 3 days' incubation of the inoculated plates no viable bacteria were observed as a result of the transfers. The test, therefore, indicates that the bacteria had been killed in dilutions of 1 to 10,000 for *Staphylococcus aureus*, 1 to 1,000 for *Bacillus niger*, 1 to 100 for *Penicillium notatum*, and 1 to 5,000 for *Clostridium sporogenes*. The data in the above table further shows that for *Achromobacter perolens* and for *Aspergillus glaucus* the antibiotic substance produced from the root of the bittersweet vine had a bacteriostatic effect. In the case of *Achromobacter perolens*, viable bacteria appeared on the second day of incubation, and for *Aspergillus glaucus* on the seventh day of incubation, at a dilution in both cases of 1 to 100.

Although acetone is the preferred primary solvent, we have found that other organic solvents are suitable, for example, dioxane, ethyl acetate, methyl ethyl ketone and ethanol. We have also found our antibiotic material to be slightly soluble in water.

It is obvious that many variations in the solvent treating process may be advantageously employed. For example, since the antibiotic material isolated from bittersweet is heat-stable, solvent temperatures may range from room temperatures to boiling temperature of the solvent, with consequent variations in extraction time, that is, the higher the temperature, generally the less time required for extraction. Moreover, the extraction process may be carried out in one step, for example, with ethanol or with a mixture of solvents. We have found it preferable to process the antibiotic substance contained in the bittersweet by a two-stage solvent process involving first, treating the substance with a primary solvent which is subsequently removed and then, second, taking up the resulting extract with another solvent, so as to form a solution, which is a convenient form of using the product. We have found that acetone is a very effective primary solvent in producing the antibiotic substance from the plant tissue. After evaporating off the acetone the preferred solution is made with ethanol. By using alcohol we utilize its well-known properties, such as non-toxicity and ability to prevent contamination.

In the processing of food products a serious problem is that of food preservation, and although great strides have been made in improving the quality and keeping time of various food products by refrigeration, canning, curing, plant sanitation, etc., the problem of the preservation of food requires the constant attention of the food processor to improve long-established methods of treating food and to devise new means of food control.

Food spoilage is due principally to microbial action, and the species of microorganisms responsible for food deterioration are numerous. The sporing genera, Clostridium and Bacillus, for example, when contaminating food, cause food spoilage. Another serious concern of the food handler is food poisoning, which is often of an insidious nature because food products contaminated with harmful bacteria often appear organoleptically sound. Among the food poisoning bacteria, the most common food poisoner is the Staphylococcus.

The antibacterial substance of the present invention may be used to retard or prevent microbial growth in various food products. This material may advantageously be employed in treating meat products, such as hams, sausages and canned meats; filled pastries, such as cream puffs, chocolate eclairs, custards, etc.; and canned vegetables, to prevent swellings due, for example, to organisms of the genus Bacillus.

The invention will be more fully understood from the following description of a method of using the antibiotic substance, in connection with the curing of hams.

Within recent years there has been developed a curing process for meats and particularly hams known as a quick-cure which requires only a fraction of the time which was normally required by the old processes. Essentially the quick-cure process consists in pumping the pickling solution under pressure into the vascular system of the meat. By this means a ham can be cured in a period of time ranging from 15 to 18 days, rather than the 60 to 90 days required by the old processes in which the meats were usually immersed in a bath of the pickling fluid.

There has arisen, however, as the result of extensive commercial use of the quick-curing method an attendant serious health problem. The hams and other meats cured by the older immersion processes were extremely resistant to the development of pathogenic bacteria, of which various representatives of the Staphylococci may be mentioned as typical, and the general public has come to rely on this property in its eating and storage habits. Hams processed by quick-curing, on the other hand, have resulted in a meat product which, though highly satisfactory when fresh, is often less resistant to these organisms, and cases of food poisoning have resulted from improper handling due to unfamiliarity with this fact.

As hereinbefore mentioned, we have found that the antibiotic reagent herein described is lethal to a number of microbes in a 1 to 1,000 dilution of the extract, the extract being of such strength that 1 ml. of the alcoholic solution thereof contained the acetone-soluble constituents in 5 grams of root. Therefore, the addition of 1 part of the solution to 1,000 parts of the conventional pickling solution will result in a meat product cured therewith which has a very marked increase in resistance to the development of pathogenic organisms.

The following is an example of a curing pickle stock, which may be used in a process for quick-curing hams when provided with antibiotic substance in the proportions outlined above; that is, the antibiotic substance is added in an amount such as to effect a 1 to 1,000 dilution of the antibiotic material of the arbitrary strength herein described (1 ml.=5 g. of root).

To 100 gallons of a 90° Salometer solution there are added:

7 lbs. sodium nitrate
10 oz. sodium nitrite
20 lbs. sugar
378.5 cc. antibiotic solution The following experiments will further illustrate the practical application of my invention. An amount of pickle was inoculated with a large number of a food poisoning type of *Staphylococcus aureus* organisms which would represent the most unfavorable conditions which could possibly be encountered. The pickle was then separated into two equal portions, and to one portion sufficient amount of bittersweet product was added to form a 1 to 1000 dilution of the product. To the other portion of pickle no antibiotic substance was added. Twelve hams were then cured by the quick-curing method—six of them with pickle containing the antibotic substance and six with pickle without the substance. The hams were then smoked according to ordinary processes. The hams were incubated at 99° F. and at the end of two weeks the six hams containing the antibiotic substance did not harbor viable staphylococci, while the other hams showed the presence of viable staphylococci.

Luncheon meat was cured according to conventional methods in which the antibiotic substance was present in a 1 to 1000 dilution. The meat product was placed in six 6-pound cans and retorted to an inside temperature of 155° F. and incubated at 99° F. After 30 days of incubation, no swelling of the cans could be observed. The control cans swelled in one week.

Obviously, many modifications and variations of the invention, as hereinbefore set forth, may be made without departing from the spirit and scope thereof, and therefore only such limitations should be imposed as are indicated in the appended claims.

We claim:

1. In the process of treating food products, the step of adding to a food product a small amount of an alcoholic solution of antibiotic substance derived from the root of the vine *Celastrus scandens* to preserve said food products against pathogenic bacteria responsible for food poisoning and spoilage.

2. A meat pickle including a small amount of an antibiotic substance of the root of the vine *Celastrus scandens* extracted from the said root by a non-aqueous organic solvent selected from the group consisting of acetone, dioxane, ethylacetate, methylethylketone, and ethanol.

3. In the process of quick-curing meats wherein a pickling solution is injected into said meat, the step of adding to said pickling solution a small amount of the antibiotic substance derived from the root of the vine *Celastrous scandens* by treatment with a non-aqueous organic solvent, whereby the growth of pathogenic bacteria responsible for food spoilage and poisoning in the meat are substantially retarded after the said solution is injected into the meat.

4. In the process of treating food products, the step of adding to a food product a small amount of an antibiotic substance derived from the root of the vine *Celastrus scandens* by treatment with a non-aqueous organic solvent to preserve said food products against pathogenic bacteria responsible for food poisoning and spoilage.

5. A meat pickle including a small amount of an antibiotic substance derived from the root of the vine *Celastrus scandens* by treatment with a non-aqueous organic solvent.

LLOYD B. JENSEN.
WILLIAM A. MILLER.

REFERENCES CITED

The following references are of record in the file of this patent:

UNITED STATES PATENTS

| Number | Name | Date |
| --- | --- | --- |
| 469,850 | Chesebrough | Mar. 1, 1892 |
| 1,113,714 | Taub et al. | Oct. 13, 1914 |
| 1,551,888 | Krebs | Sept. 1, 1925 |
| 1,559,340 | Masucci | Oct. 27, 1925 |
| 2,084,864 | Paddock | June 22, 1937 |
| 2,098,110 | Schertz et al. | Nov. 2, 1937 |
| 2,117,478 | Hall | May 17, 1938 |
| 2,173,992 | Allen | Sept. 26, 1939 |
| 2,180,750 | Urbain | Nov. 21, 1939 |
| 2,316,311 | Boatner | Apr. 13, 1943 |

OTHER REFERENCES

King: "American Dispensatory," 8th edition, published in Cincinnati, Ohio, 1870, page 200.

Bernhard: Am. J. Pharm., vol. 54, pages 1 to 5, 1882.

"Nature," May 13, 1944, vol. 153, page 598, article entitled "Antibacterial Substances in Green Plants."

"Chemical and Engineering News," September 1945, page 1622, article entitled "Penicillin as a Preservative."